B. C. Blomstens
Imp.d Cultivator.
118186
PATENTED AUG 22 1871
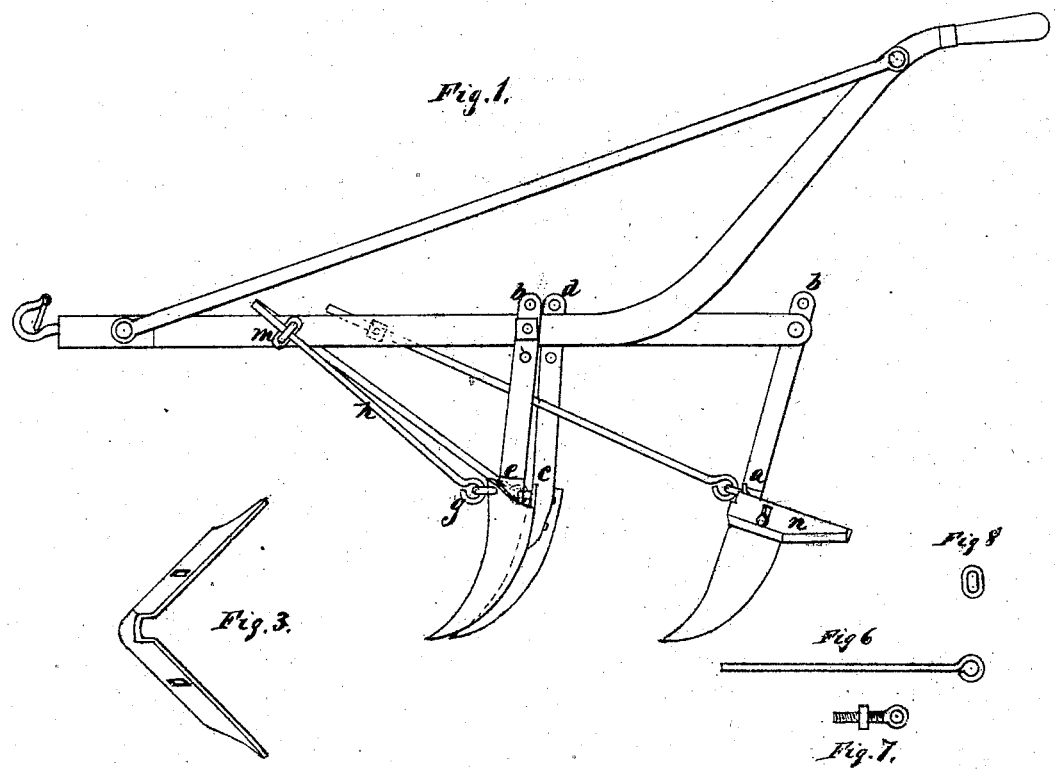
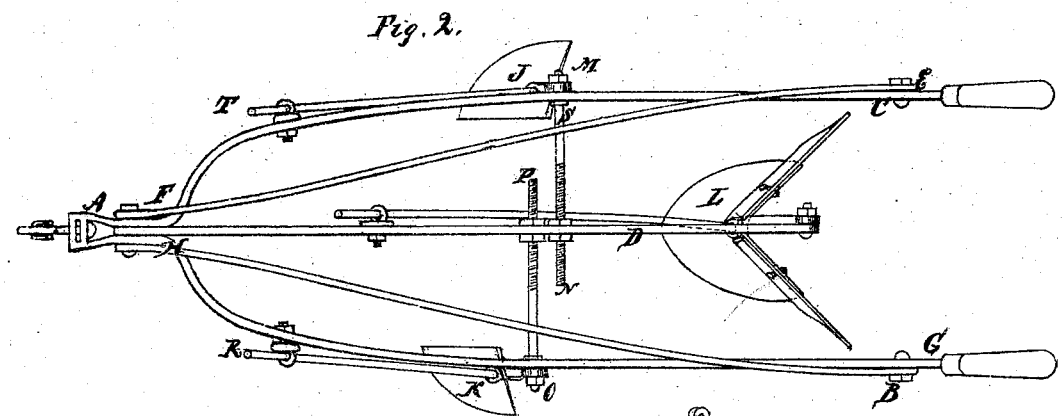
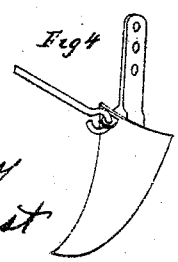
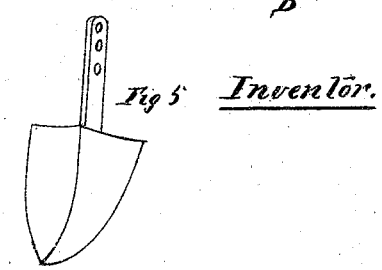
Witnesses:
Olof E. Drewry
William A. West
Inventor
Bengt C. Blomsten

UNITED STATES PATENT OFFICE.

BENGT C. BLOMSTEN, OF WAUPACA, WISCONSIN.

IMPROVEMENT IN CULTIVATORS.

Specification forming part of Letters Patent No. 118,186, dated August 22, 1871; antedated August 8, 1871.

*To all whom it may concern:*

Be it known that I, BENGT C. BLOMSTEN, of the village of Waupaca, in the county of Waupaca, State of Wisconsin, have invented certain Improvements in Cultivators, of which the following is a specification:

This invention relates to that class of cultivators which is provided with means for adjusting the width of the frame; and consists in certain details of construction, which will be fully described hereinafter.

In the drawing, Figure 1 represents a side elevation of my improved machine. Fig. 2 represents a plan view of the same; and Figs. 3, 4, 5, 6, 7, and 8, views of various parts detached.

To enable others skilled in the art to make and use my invention, I will now proceed to describe fully its construction and manner of operation.

I preferably construct my cultivator with the side beams consisting of a single metallic strip suitably bent, which forms the support for the side shovels, and also forms the handles E G, as clearly shown in Figs. 1 and 2. The front end of the bent bar is suitably formed to receive the attachment for the draft devices, as shown at A. I also employ a central beam or bar secured in front by means of the bolt which holds the front ends of the brace-rods F H, and toward its rear end by the cross-rods N P, by means of which it is properly connected to the side beams. These cross-rods are threaded upon their inner ends, and provided with nuts upon each side of the central beam for the purpose of enabling the side beams to be adjusted closer together or wider apart, as may be desired. The side beams are each provided with a shovel, J K, of peculiar shape, as clearly shown in Figs. 2 and 4, and the central beams with a shovel, L, as shown in Figs. 2 and 5. These shovels are attached by means of standards *a e c*, which latter are secured to the beams by suitable bolts. They are rendered vertically adjustable by means of orifices, as shown in Figs. 1, 4, and 5. To each shovel a brace-rod, *h*, is connected by means of a hook and eye, *g*, the front end of which is properly secured to the beam by means of an eyebolt, *m*, as clearly shown in Fig. 2. By means of this construction the pitch of the shovels is easily regulated as may be desired. In Fig. 3 is shown a mold-board, *n*, peculiarly adapted for attachment to the central shovel L. It is provided with a central recess and orifices for the introduction of bolts. This is especially designed for hilling potatoes, in which case the side shovels are thrown up toward the beams out of the way.

The implement as a whole can be used for any of the purposes for which such implements are designed.

The side shovels are interchangeable, and they therefore can be arranged to throw earth to or from the crop, their peculiar construction permitting them to run very close to the hill.

Having thus fully described my invention, what I claim as new, and desire to secure by Letters Patent, is—

The cultivator described, provided with the elastic side beams formed of a single metallic bar bent as described, and central beam united to the side beams by the connections described, each beam having standards provided with a longitudinally-adjusting brace-rod, the parts being combined and arranged as and for the purpose set forth.

BENGT C. BLOMSTEN.

Witnesses:
O. E. DREUTZER,
CALEB S. OGDEN.